INVENTOR.
DAVID H. KAPLAN
BY
Carl Fissell Jr.
AGENT

Feb. 21, 1967 D. H. KAPLAN 3,305,826
VISUAL GUIDANCE SYSTEM FOR APPROACH AND LANDING OF AIRCRAFT
Filed Feb. 3, 1964 6 Sheets-Sheet 2
Fig.2
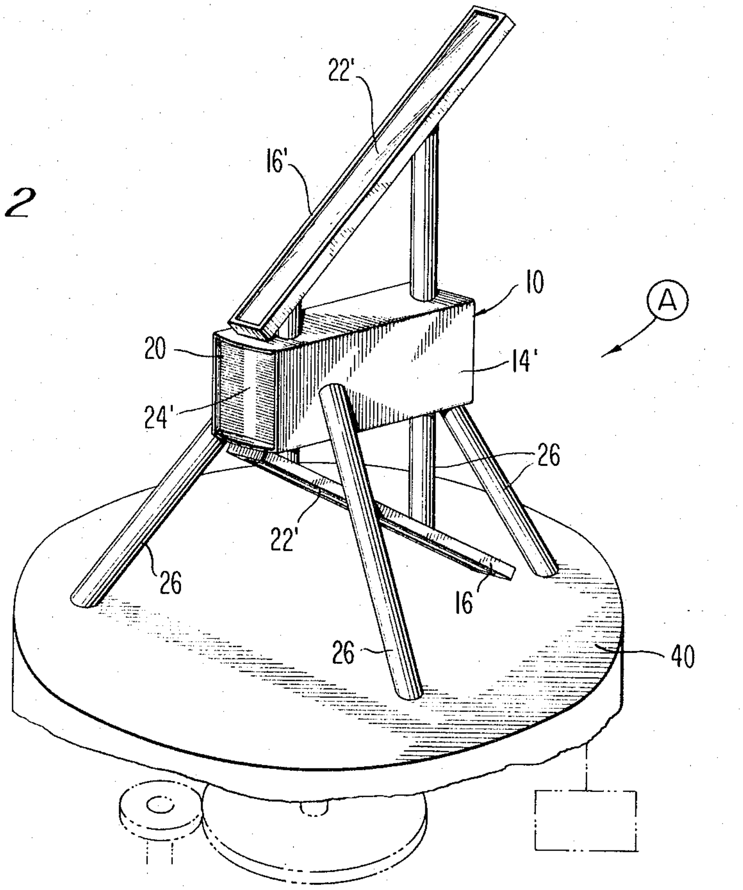
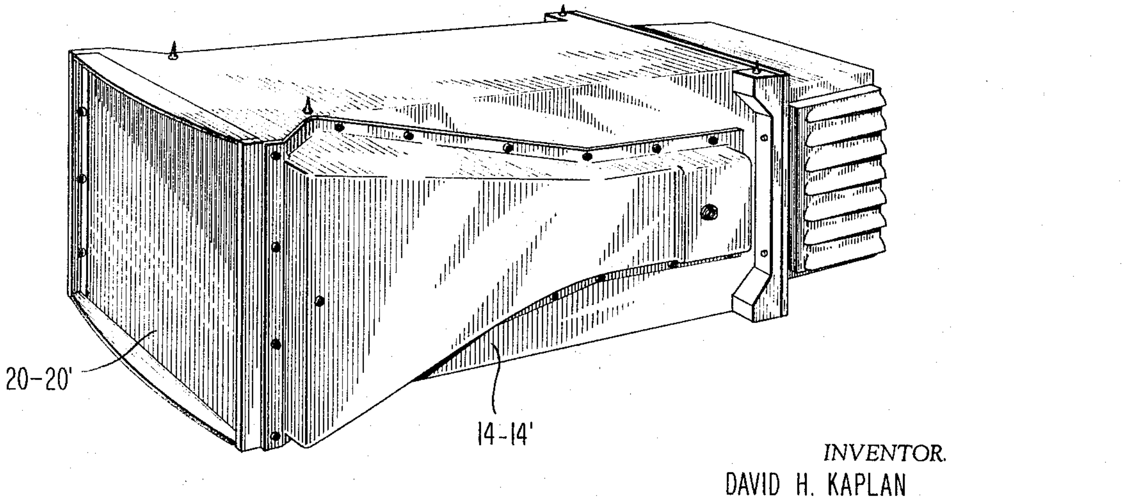
Fig.3
INVENTOR.
DAVID H. KAPLAN
BY
Carl Fissell Jr.
AGENT INVENTOR.
DAVID H. KAPLAN
BY
Carl Fissell
AGENT

| D | $V_t$ |
|---|---|
| 500' | 36 MPH |
| 1000' | 72 MPH |
| 1500' | 107 MPH |

| θ | D | $V_P$ |
|---|---|---|
| 22° | 500' | 100 MPH |
| 25° | 430' | 80 MPH |
| 35° | 300' | 45 MPH |
| 60° | 110' | 20 MPH |
| 80° | 30' | 14 MPH |

INVENTOR.
DAVID H. KAPLAN
BY Carl Fissell Jr.
AGENT

INVENTOR.
DAVID H. KAPLAN
BY Carl Fissell Jr.
AGENT

INVENTOR.
DAVID H. KAPLAN
BY Carl Fissell Jr.
AGENT

Feb. 21, 1967     D. H. KAPLAN     3,305,826
VISUAL GUIDANCE SYSTEM FOR APPROACH
AND LANDING OF AIRCRAFT
Filed Feb. 3, 1964

INVENTOR.
BY
*Carl Fissell Jr.*
AGENT

United States Patent Office 3,305,826

Patented Feb. 21, 1967

3,305,826

VISUAL GUIDANCE SYSTEM FOR APPROACH AND LANDING OF AIRCRAFT

David H. Kaplan, King of Prussia, Pa., assignor to Burroughs Corporation, Detroit, Mich., a corporation of Michigan Filed Feb. 3, 1964, Ser. No. 342,147
7 Claims. (Cl. 340—26)

The present invention relates to apparatus and method for the safe and efficient guidance of automotive vehicles, e.g., land, sea and/or aircraft from an acquisition area to a terminal area. More particularly, although not necessarily exclusively, the invention relates to apparatus for perceptually indicating a useful and safe slope or angle as well as providing lateral directional guidance required to lead a vehicle accurately and safely into a specific designated arrival area. With still more specificity, the present invention has to do with electromagnetic, e.g., optical-visual apparatus useful in controlling and guiding automotive vehicles such for example, as rotary wing type aircraft to a safe hover point or landing area without pilot reference to inboard or cockpit instrumentation.

Although the present invention is particularly useful in the automatic guidance of aircraft vehicles the method and apparatus may also find employment as a guidance device for surface water craft, submarine under sea craft as well as automobiles traveling strictly upon the surface of the land. In addition to the foregoing, the present invention can be employed with so-called ground effect vehicles.

As will be pointed out more succinctly later on herein the invention has general useful application to any vehicular situation wherein the operator of the craft has control of his path and velocity either in two or three dimensions.

In conventional propeller driven aircraft, the source of thrust force, i.e., the propeller, is separate from the source of lift force, i.e., the wing. Thus it is possible for the airplane to be tilted relative to its flight path in steady state flight, e.g., a steady side-slip. Rotary wing aircraft such for example, as the helicopter, on the other hand, derive both lift and thrust forces from the same source, i.e., the rotor. The steady state flight path must always be in the direction of the tilt of the rotor, and thus the flight path depends almost entirely upon the tilt of the rotor. For this reason, therefore, if control is provided for the flight path of the helicopter, the attitude of the aircraft is also controlled. Also, if the flight path is controlled with respect to both track and velocity, then substantially complete control of the aircraft is provided.

These differences between conventional propeller driven aircraft and rotary wing aircraft such as helicopters are an important aspect of the problem of establishing an optimum landing aid. For example, the term "flight path vector" means the velocity and direction of flight through the air space relative to the ground. Thus, when the word "path" is used, both direction and velocity is indicated. Velocity is defined as the time rate of motion in a given direction and sense. The airplane pilot must have knowledge of both his attitude and his path during a landing approach. This information is acquired by combining cues from his cockpit instruments with external cues, i.e., glide slope indication can be derived from position information external to the aircraft such as the airport runway, markings, lighting arrangements, radio, etc.

The rotary wing pilot can make a safe landing if he has complete "path" information alone. Since his path defines the attitude of his aircraft, there is no necessity to monitor attitude. The implication of this difference between conventional aircraft and rotary wing aircraft is that the helicpoter can be landed without reference to cockpit instruments if complete path information were provided for the pilot, and of course, this means that the flight direction or glide slope information could be supplemented by rate cues or indications of the velocity along the glide slope, relative to the ground.

The problem of maneuvering a rotary wing aircraft at low speed and during transition to hovering is complicated by the nature of the helicopter control response and the pilot's cues. The helicopter pilot generally is unable to kinesthetically sense horizontal accelerations of the machine. Conventional vehicles which accelerate forward causes the operator to be pushed backwardly. Acceleration is sensed by the pressure of the operator against the seat. However, the acceleration of a helicopter can only be produced by tilting the entire machine in the direction of desired acceleration. The resulting acceleration remains normal, or downward, relative to the pilot's seat, and therefore he is unable to differentiate between what might be either a vertical or horizontal acceleration in any direction. The helicopter pilot is not able therefore to sense kinesthetically when the machine starts to translate or is stopping gradually.

For this reason, the helicopter pilot requires a visual means of detecting the rate of motion of the helicopter relative to the ground. In normal daytime visual or contact flying, cues are picked up both by the pilot's peripheral vision, sensing ground objects moving by on both sides, and by direct visual sensing of the motion of known objects relative to direct fixed points on the airplane itself, i.e., sliding past the windshield frame.

During night visual flight, difficulty arises from the fact that lights appear as point images to the pilot. Thus, if he is not very familiar with the size, shape and distance that the light represents, the lights cause confusion to him when he tries to use them as cues for judging this relative motion. The confusion arises generally from the human factors involved in judging distances.

It is an important object, therefore, of the present invention to solve the foregoing problems in a new and novel manner.

It is another object of this invention to provide an electromagnetic radiation producing apparatus providing precise guidance and control of automotive vehicular traffic, e.g., land, sea or aircraft from acquisition to termination of the crafts' movement.

A further object of the invention is to provide a fail-safe, inexpensive and adaptable high volume traffic control for automotive vehicle traffic, e.g., land, sea or air craft.

Still another object of this invention is to provide velocity cues for aircraft effectively determining the approach rate in transition to hovering which do not rely on identification of light patterns or the normal ground visual velocity cues.

A further object of the invention is to provide control apparatus for indicating to a craft's operator a safe path to a termination point which requires no instrumentation within the craft itself.

An additional object of the invention is to provide aircraft landing aid apparatus which does not require prior operator training in using the aid.

In accordance with the foregoing objects and first briefly described, the present invention comprises automatic vehicular guidance apparatus including means for radiating electromagnetic energy in a manner to establish a pair of intersecting planes of radiation wherein said planes define an imaginary line of energy which appears to recede from the observer's position at a progressively decreasing speed from "far out" to "near in" with relation to the radiation generating means, thereby delineating a path toward the energy radiating means along which the observer may move safely and efficiently in approaching a terminal position adjacent thereto.

In accordance with the foregoing, other and additional aspects of the present invention comprise, a visual-optical landing system for aiding rotary wing aircraft pilots in making a landing approach to a helicopter pad or landing area including angularly mounted illuminated datum bars oriented relative to each other and to a base or reference in a manner to give direct visual indication of a glide path, landing rate, and the direction of the live runway leading to the landing pad. Each such apparatus may include a pair of optical devices mounted on slewing or rotating platforms. Two of the devices are generally vertically mounted while a third optical system is horizontally mounted relative to the other two thereon. The platforms rotate toward each other at a constant preadjusted angular velocity in synchronism. The two vertically mounted systems indicate the direction the craft must be moved and the rate at which it must approach the terminal area. The horizontal optical system indicates the glide path angle which the craft must follow to reach the terminal area safely.

The basic concept to which the invention has application can be achieved with a single rotating unit if means are provided for maintaining the vehicle on a center line or in a vertical plane.

The invention both as to its organization and method of operation, together with further objects and advantages thereof, will best be understood with reference to the specification and claims taken in connection with the accompanying drawings in which:

FIGURE 2 is an isometric view of an additional embodiment of rate indicating apparatus for use with the present invention;

FIGURE 3 is a perspective view of a separate indicating cell for the landing system of the present invention;

Figures 15, 16, 17:
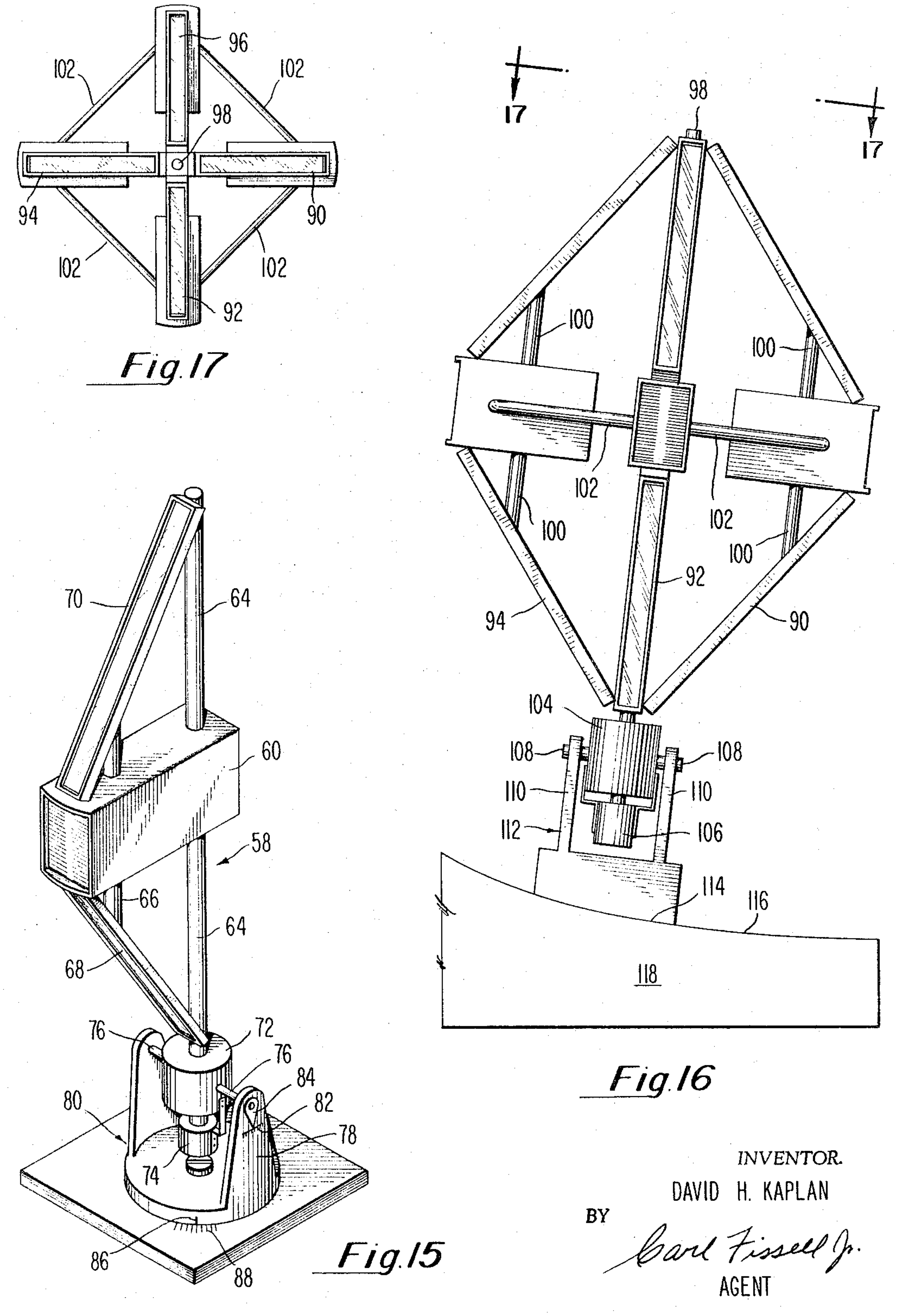

FIGURES 7 through 14 inclusive are diagrams illustrating the functions of the multiple unit system of the present invention and showing various on-path, off-path, high-low indications produced by such units;

FIGURE 15 is an isometric view of a different form of rate indicating apparatus for use with the present invention;

FIGURE 16 is a side elevational view of a multi-unit rate indicating structure embodying the present invention; and FIGURE 17 is a view along the line 17—17 of FIGURE 16.

Figure 1:
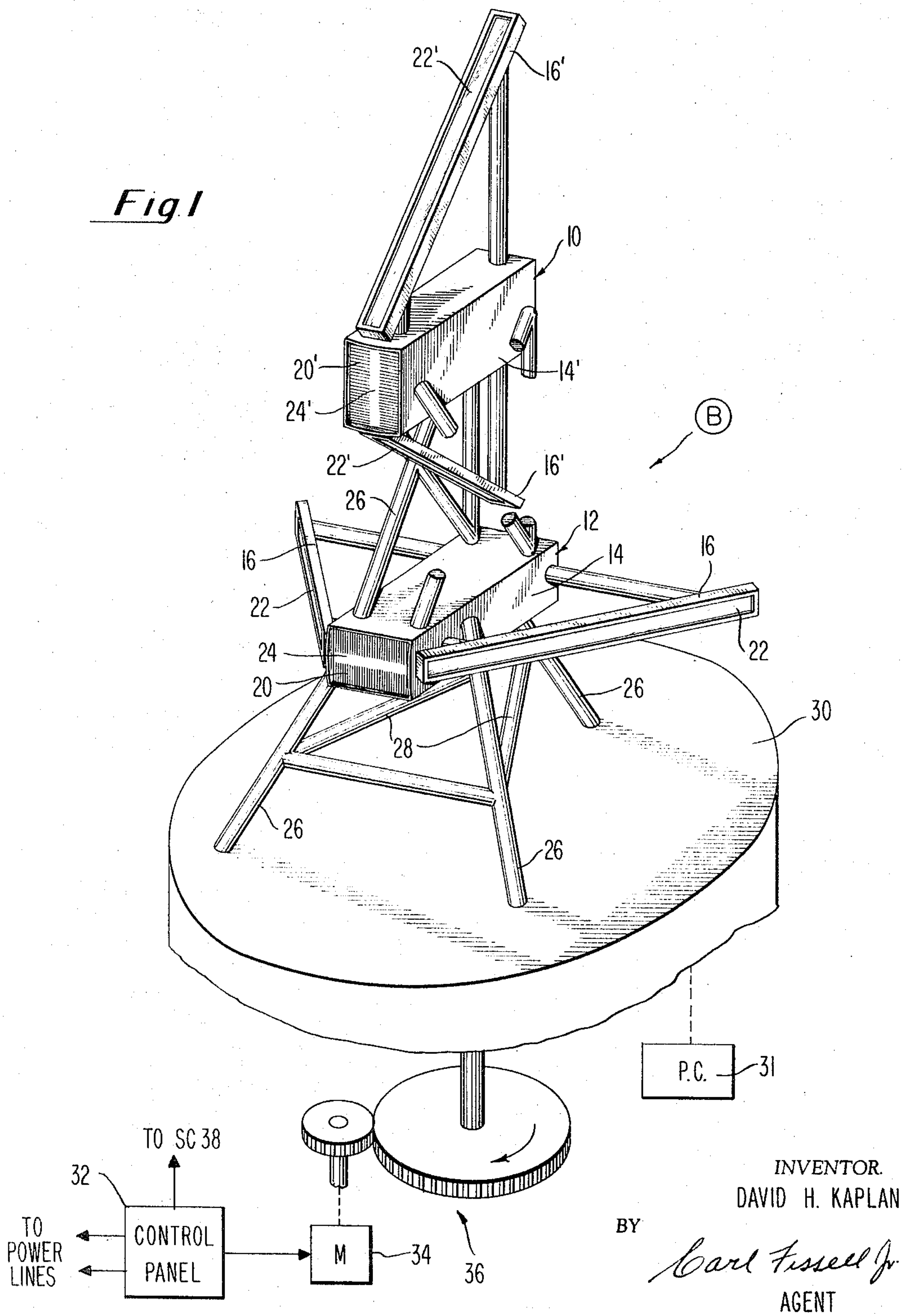
FIGURE 1 is an isometric view of glide path and rate indicating apparatus for the present invention.

Turning now to a detailed description of the apparatus of the present invention and referring first to FIGURE 1 of the drawings, there is shown a portion of the guidance system and apparatus embodying the present invention. It can be seen that the guidance device therein depicted includes two types of indicating apparatus 10 and 12. The vertically disposed unit 10 is referred to as the rate indicator. The horizontally disposed unit 12 is referred to as the glide path indicator.

The glide path indicator 12 consists of a Fresnel lens cell assembly 14 and two sight bar references or datum arms 16 extending angularly backwardly away from the front or image forming portion 20 thereof. The Fresnel lens assembly 14 is or may be substantially similar in construction and operation to the light units shown and described in copending U.S. patent application to James A.

Ogle and Domenic Turchi, entitled "Optical Scanning Apparatus," Serial No. 185,540, filed April 6, 1962, now Patent No. 3,233,216, and assigned to the present assignee. The reference arms 16 may be illuminated by any suitable means, such, for example, as a fluorescent bar light 22, or one or more individual incandescent illuminating devices. The reference arms provide a datum line of light, as will be more particularly described hereinafter. The Fresnel cell assembly 14 at the apex of the datum line of light provides an image of a bar of light 24 at a distance of approximately 150 feet behind the datum arms themselves. A displacement in a vertical direction will cause displacement of the image from the datum lines. As the image in the datum lines is initially oriented to the correct glide angle, displacement of the image from the datum line is proportional to displacement of the image from the glide path and thus is an indication to the pilot of his relative position with respect to such glide path indication.

The rate indicator 10 also includes a Fresnel cell assembly 14' similar to cell 14 but oriented at right angles to the glide path indicating apparatus 12 and includes two angularly, backwardly oriented, datum arms 16' including illuminating means 22' and means for producing an image bar 24' as hereinabove set forth. In the illustration of FIGURE 1, the rate indicator 10 is disposed above the glide path indicator. However, as will be pointed out more particularly hereinafter, this is a matter of choice of design tending to make a more compact and efficient grouping of component parts and is not considered limiting from the standpoint of the inventive concept included herein.

Figures 5, 6:
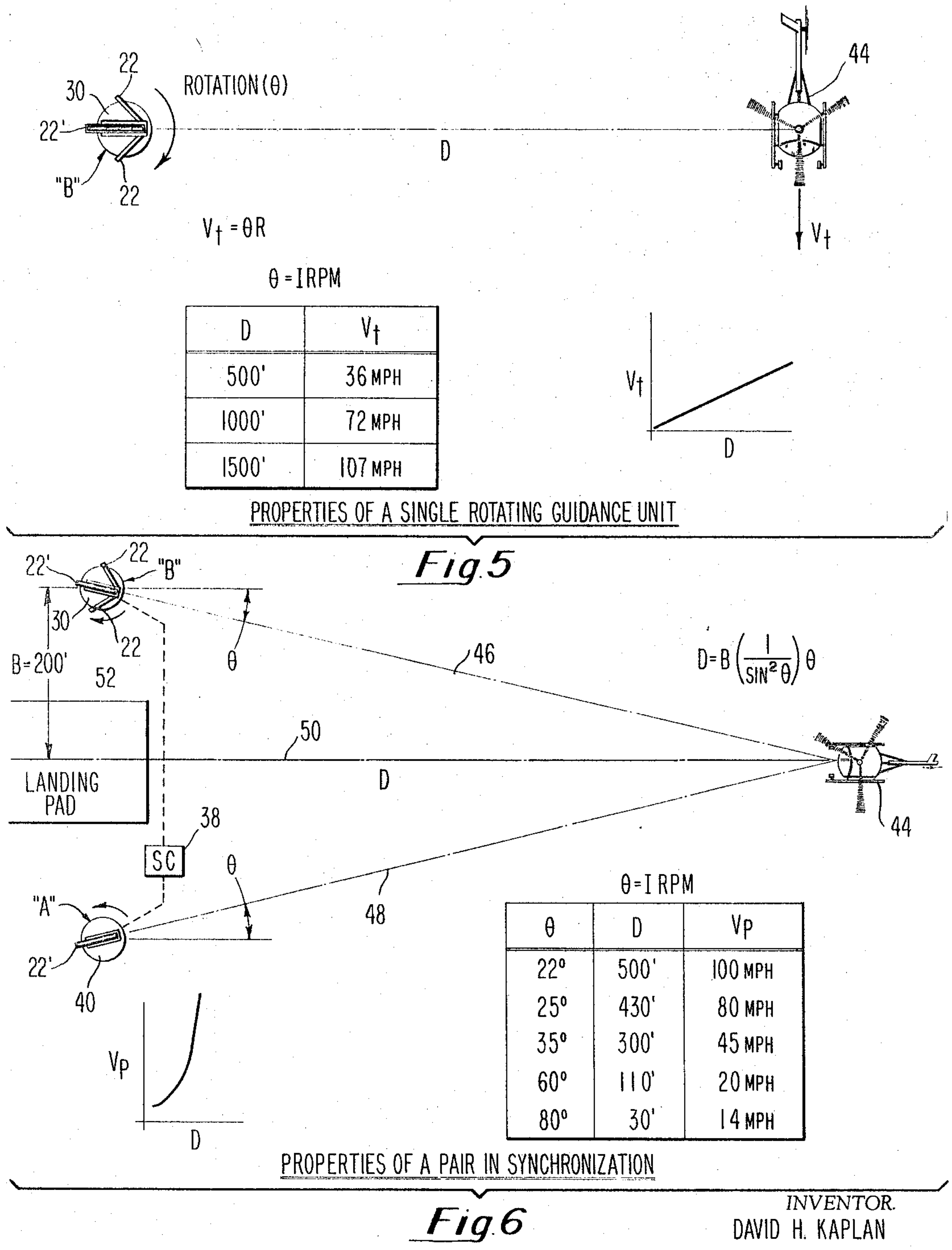
FIGURE 5 is a schematic illustration of a vector diagram and chart showing the properties of a single rotating guide unit for the present invention.
FIGURE 6 is a schematic illustration similar to FIGURE 5 but showing the properties of a pair of guide units in synchronism.

The two indicating units 10 and 12 are mounted by means of appropriately angled legs 26 and suitable cross braces 28 on a rotating or slewing platform 30. A pitch or vertical angle control and adjustment means 31 is provided for altering or changing the angle of the glide path indicator 12 with respect to the horizontal or horizon for purposes which will be pointed out hereinafter, since it is necessary to incline the slewing axis along with the change in inclination of the glide path. A control panel 32 contains a lamp brightness control for the datum arm and cell lights and a motor speed synchronism control for controlling the driving motor 34 and associated gearing 36 for rotating platform 30, and as seen in FIGURE 6, for constantly keeping two or more of such platforms in synchronism by means of the synchronizing control 38. The brightness levels of cells and datum arms 15 is adjusted to low ambient lighting levels and pilot preferences. Motor speed controls permit the maintenance of a constant helicopter approach rate under varying wind conditions.

As described in more detail in the hereinabove referenced copending application to Ogle and Turchi, the cell assembly 14–14' as shown in slightly more detail in FIGURE 3, contains three image forming lamps. The optical system employed enables the image thereby formed to be projected 150 feet behind the datum line and consists of a combination of a ground glass screen, a Fresnel lens, and a lenticular lens. The ground glass screen is illuminated by the three lamps and serves as the objective for the system. The Fresnel lens performs the same task as a planar convex lens. The lens projects a virtual image of the object at an image distance of 150 feet behind the lens. The lenticular lens acts to spread the viewing area of the object to provide broader coverage without changing the image size. The cell assembly also contains a heating system to maintain the lenses at a constant temperature thereby eliminating optical faults due to temperature changes.

In one preferred embodiment of the invention the bars 16–16' of datum lights consist of a bank of fluorescent lamps mounted behind an acrylic screen. However, as hereinbefore noted, illumination of the datum line can be provided by any suitable means which will produce the candle power necessary for the particular application with which the invention is or may be employed.

A second platform 40, similar to platform 30, is seen in FIGURE 2 to include a single indicating unit 10 disposed in vertical arrangement for rate indication. The platforms 30 and 40, on which the glide path and rate indicators 10 and 12 are mounted, are adapted to be rotated or slewed by means of motor and gear train similar to motor and gear train 34 and 36, at constant angular velocity about their vertical axes. Pitch control is also provided for manually adjusting the platforms to the correct glide path angle without disturbing the relative positioning of the indicators with respect to the platform. The platform angular velocity can be incrementally changed to correct for varying wind velocity.

Light intensity of the cells 14 and 14' and datum bars 16–16' are individually controllable by means of the control panel 32 hereinbefore mentioned. The light intensity is controlled by a dimmer circuit (not shown) so that brightness can be varied over a relatively wide range. For example, the brightness can be programmed from high intensity at long range to low intensity at the hover point where the aircraft would actually put down on the landing pad. Lighing can also be flashed for coded identification of the units.

Although it is contemplated that the rays of three or four or more, synchronized units (A, B, C and D in FIG. 4) can be utilized for operations involving high density air traffic and landing in any direction, as, for example, a circular landing pad and wherein means is provided for adjusting the speed of the platforms to the speed of the aircraft, the following description will consider and refer generally to a basic two-unit arrangement, wherein the datum bars provide the pilot with visual reference cues relative to a ground based direction which is not possible with ordinary rotating light beams. With the device rotating, the pilot can employ it for homing down a glide path slope, and when flying at right angles to the glide slope the pilot can use the visual cue for maintaining the proper traffic pattern by helping to measure the combination of ground speed, the distance out, and altitude. The skewed reference lights make it possible to locate oneself relative to the cue line of the light at large angles.

In the description which follows hereinafter, the guide units shown in detail in FIGURES 1, 2, 4 and 6, and schematically in FIGURES 7–14, inclusive, will be referred to as units A and B, respectively. It is to be understood that unit A includes a rate indicator 10 and a glide slope indicator 12, while unit B includes merely a rate indicating apparatus. It should be apparent that the indicating units could each be separately mounted to individual rotatable platforms or tables and that the present arrangement is one of design choice only and not a limitation upon the inventive concept involved.

Figure 7:
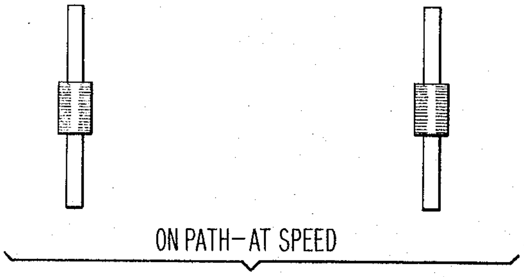
Figure 12:
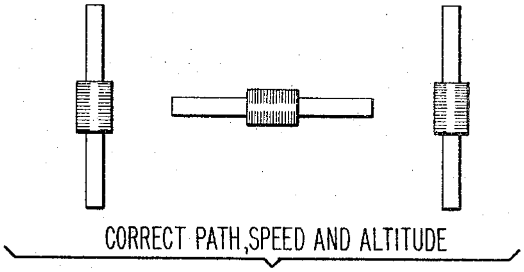

As seen by reference to FIGURES 7 and 12, the units A and B, each with two illuminated members 16—16 together with the Fresnel lens assembly 14 appear to an observer as a continuous straight line of light when viewed "head on." As seen from any other lateral or transverse aspect or angle, the assemblies appear as a directional arrow-head (see FIGURES 8–11 and 13 and 14, respectively). The Fresnel lens assembly or light projector 14–14' is such that an intense internal bar of light 24 is seen when viewing the cell. As hereinbefore mentioned, the optical arrangement of the present invention causes the light bar 24 to appear to be approximately 150 feet in back of the cell assembly. However, a small change in viewing aspect (angle) causes a large change in the position of the projected image of the light bar on the front surface of the cell. Approximately 20 minutes of arc change in viewing angle causes the bar to move from one extreme to the other, e.g., from right to left of the cell face. Thus the light bar 24 forms an extremely sensitive indication of viewing angle while the two datum lines 16—16 form a coarse viewing angle indication.

It can be seen that slight rotation of the assembly 30 from the "head on" position of FIGURES 7 and 12 shifts the light bar 24 of the Fresnel unit 10, for example, parallel to its original position opposite to the direction of motion. This is opposite to the motion of the assembly, not the observer. The light bar moves in the same direction as the observer (relative to the frame). If the observer is motionless, the light bar remains (angularly) fixed in space. If the assembly is rotated more than approximately 10 minutes of arc, the Fresnel light bar will disappear and the changing aspect of the datum arms will begin to form the arrow-head, above referred to, pointed in the direction in which the observer must shift his eye to recapture the Fresnel light bar 24 (see FIGURES 8–11 and 13 and 14).

It is seen that with the present invention, several degrees of freedom of motion are provided for the radiation generating apparatus. The units must be rotatable about a slewing axis. Also, the units must be adjustable so as to bring the slewing axis to the correct space angle. The space angle is represented by two components $\alpha$ and $\beta$. $\alpha$, alpha is the angle between the slewing axis and the vertical, measured in a vertical plane, parallel to the centerline of the runway. $\beta$, beta is the angle between a horizontal line and the slewing axis measured in the plane containing the center of the unit and normal to the intended glide path of the craft, e.g., helicopter.

The slewing axis is a line normal to a plane hereinafter referred to as the "plane of action" of the specific unit. This is the plane in which the craft's operator is receiving a displacement cue from the unit. The plane of action of each unit is defined as a plane formed by the glide slope line and the center of the unit.

Figure 4:
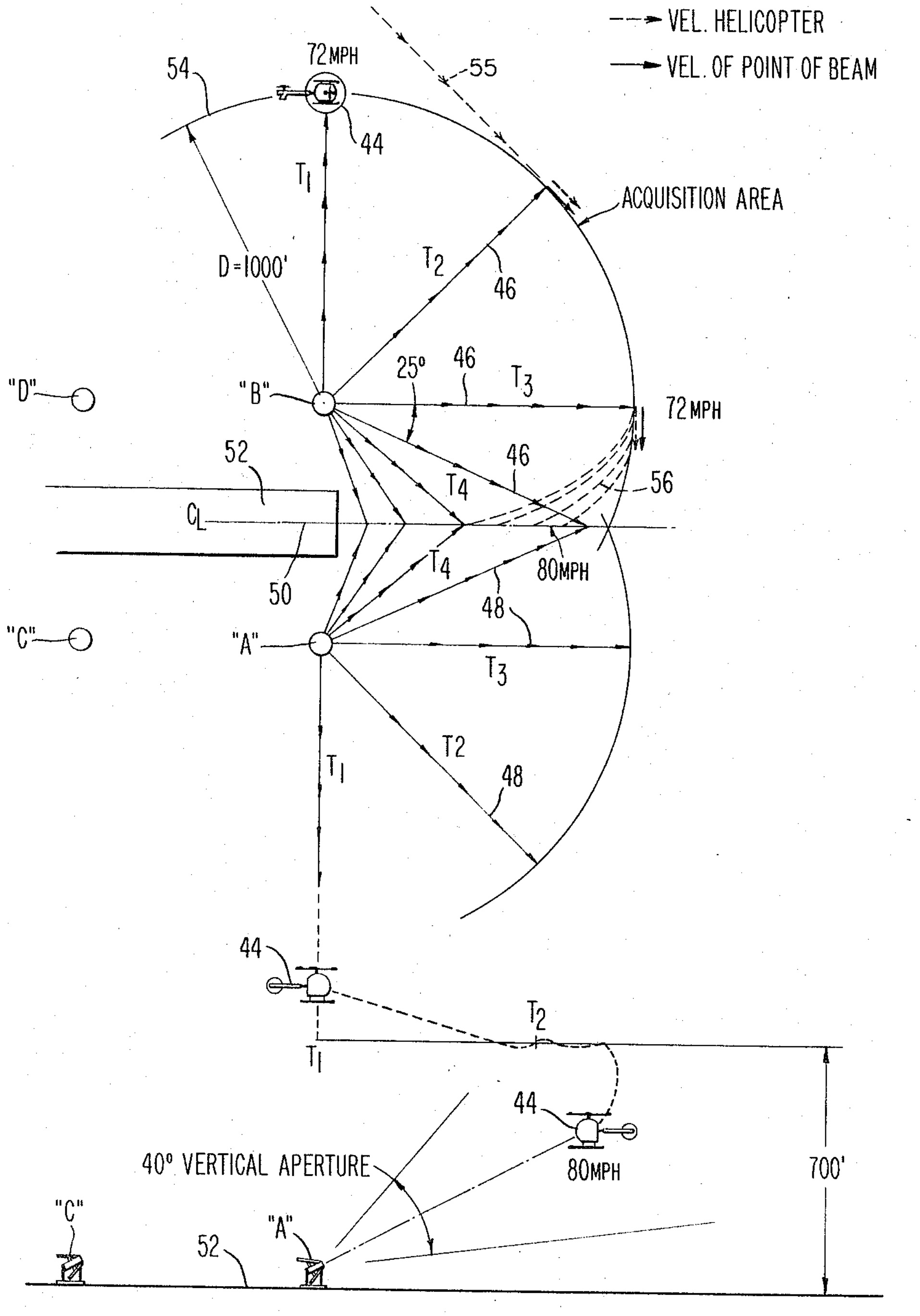
FIGURE 4 is a diagrammatic view of a landing procedure for use with the system of the present invention.

The arrangement of FIGURE 4 illustrates the location of the slewing axis of a square array of four radiating units set for a so-called standard 200 feet by 400 feet heliport runway.

The principle of operation of the invention is three dimensional triangulation in order to establish a point in space. At any instant in time, the units are aligned about their slewing axis so that the operator's lines of sight to the units are intersected at the desired point so that the operator's eye is "on" the correct guide path for an optimum approach and approach path. The response of the reference point referred to as the "operator's cue" with respect to the rate of rotation of the sight bar unit is in accordance with the expression:

$$D=B\left(\frac{1}{\sin^2 B}\right)\theta$$

The units are, as earlier mentioned, driven at constant angular velocity. The rear units C and D, when used, must be corrected to track with the front units A and B.

Referring to FIGURE 5, it is seen that with the assembly 30 rotating at a constant angular velocity (e.g., 1 revolution per minute) about an axis in the plane formed by the datum arms 22'—22', the reference plane formed by the datum arms and the Fresnel projector will rotate in a corresponding manner. It is, of course, noted that means is provided for adjusting the relative speed of operation of the units with respect to the speed of the craft utilizing such apparatus.

If a vehicle, e.g., a rotary wing aircraft 44, FIGURE 5, is flown at a distance D from the rotating unit B of FIGURE 1, and if the pilot maneuvers his craft so as to remain within the reference plane, he will fly in a circle at a constant speed. For example, if D is 1000 feet, then his speed will be 72 miles per hour. Conversely, if the aircraft remains in the reference plane hereinbefore referred to and maneuvers toward or away from the indicator unit, keeping his speed constant at 72 miles per hour, he will remain at a constant 1000 feet from the unit.

Refering next to FIGURE 6, assume that the two indicator units "A" and "B" are operating in unison, both rotating in opposite directions toward each other. Each unit defines a reference plane 46 and 48, respectively, and the intersection of these planes forms a line which moves toward a line connecting the two units along the perpendicular bisector 50 of that line, e.g., the center line of the runway or pad. If the bisector 50 is the desired approach path to the landing area or heliport, it can be seen from FIGURE 6 that if the pilot continuously observes both indicators and maneuvers so as to stay in both reference planes simultaneously, he and his craft will be drawn along the approach path 50 at a rate of speed determined by the rotational speed of the two indicator units in accordance with the earlier set forth expression $$D=B\left(\frac{1}{\sin^2 B}\right)\theta$$

where D is the velocity along the glide path and $\theta$ is the angular velocity of the sight bar units.

Assuming the two indicators A and B to be synchronized in exactly opposite phase so as to rotate toward each other at a constant 1 r.p.m. and to be located 400 feet apart, then the velocity of the craft remaining in the two reference planes will vary from 100 m.p.h. at 500 feet, to 14 m.p.h. at 30 feet, as seen in the chart in FIGURE 6. For purposes of convenience and tighter spacing, the glide slope or vertical angle of descent indicator 12 is incorporated with the rate indicator 10 on a single rotating platform 30, but angled 90° to the rate indicator 10. Suitable means operably associated with the pitch control 31, such for example, as a rack and pinion, permits the entire assembly to be tilted "upwardly" at such angle that the glide slope indicator 12 correctly defines the desired slope plane for safe landing.

A typical landing procedure and pattern for a rotary wing aircraft 44 is set forth in FIGURE 4 and is described hereinafter with reference to the air of indicator units A and B, at least one of which includes both rate and glide path indicators 10 and 12. It is understood that other and different combinations of units are within the purview of the present invention and that neither the description which follows nor the drawing of FIGURE 6 is considered to limit the inventive concept.

In operation of the system incorporating the present invention, when the helicopter pilot approaches the landing pad 52, he flies in in a relatively large circle 54 at an altitude of between 500 to 800 feet. Or, he may intercept the light indicator along a tangential path, as indicated by the dashed-arrow-line 55. As he flies above the pad 52, he reaches a point in space where he will detect a light image from one of the optical landing system indicators A or B. He then begins to turn so as to approach the helicopter pad maintaining the light in the vertical optical indicator centered with the associated datum arms and the light of the horizontal system centered with its datum arms.

At $T_1$ the pilot has adjusted his speed, altitude and distance so that he is approximately 1000 feet from indicator A and traveling at 72 m.p.h. At some indefinte area $T_2$ the acquisition of the indicator light is complete, i.e., visual and correct reference and control is made so that the indications provided by the arrow-head-like light bars are a true indication of the direction in which to fly.

At $T_3$ the pilot begins to turn in closer toward indicator A and begins to see or acquire the second indicator B which has now turned so that its reference plane 48 is approximately parallel to the line 50. As the two reference planes turn toward each other, the pilot adjusts his speed and direction as indicated by the dashed lines 56 so that his maneuvering is completed at area $T_4$. At this time he visually acquires the glide slope indication 24 and reduces his altitude (or corrects the same) so as to stay exactly on the intersection of all three planes. The pilot continues to fly in accordance with the rate "cues" to bring his craft at a continually decreasing velocity to the hover point over the pad 50 in accordance with the speed distance and angle chart of FIGURE 6.

If during the approach or landing maneuver the pilot is on path and at the proper speed he will see the indication as illustrated in FIGURE 12.

Figure 13:
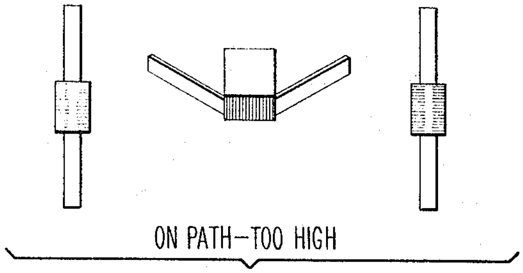
Figure 14:
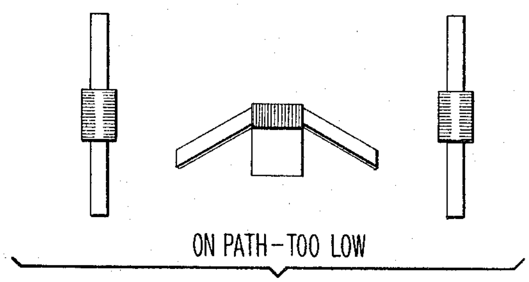

If he is on path but too high then he sees the indication in FIGURE 13. If he is on path but too low he sees the light as shown in FIGURE 14.

Figure 8:
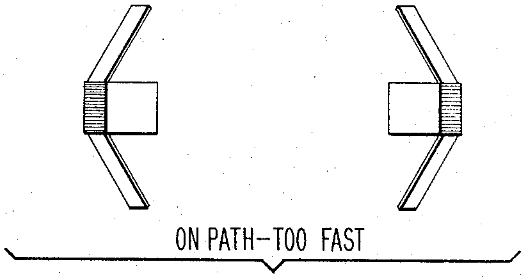
Figure 9:
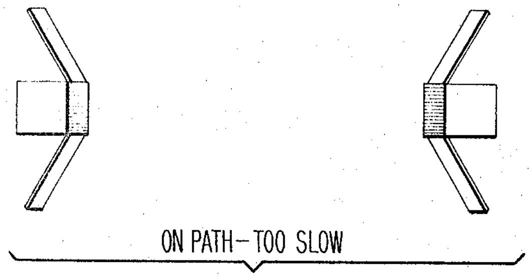

If the path is correct but the aircraft is approaching too rapidly, the pilot will see the indication of FIGURE 8. If he is too slow in his approach he sees the light as in FIGURE 9.

Figure 10:
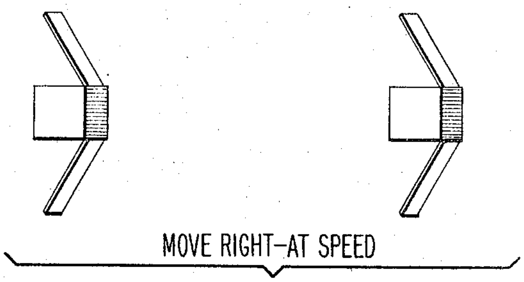
Figure 11:
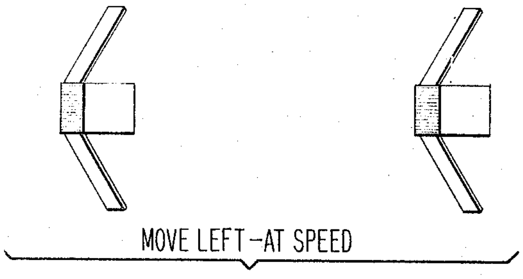

With the speed correct but approaching too far to the left the pilot would see the arrow heads pointing to the right as in FIGURE 10. Conversely, he would be warned to move left as in FIGURE 11 if he was too far to the right of the viewing on approach.

This it is seen that the three indicators on the two rotating units form three intersecting planes, and the point in space thereby defined guides the pilot down a glide slope, on a desired approach path, at a constantly decreasing speed to a hover point directly adjacent the landing pad.

It should be apparent from the foregoing that the skewed reference lights also form a unique safety feature supplementing the sight bars. It is possible for a pilot to transpose the interpretation of a sight bar due to kinesthesia and reverse its interpretation, just as can be done with the gyro horizon in the cockpit of his craft. However, with the present invention the pilot receives a different type of cue, i.e., the arrow-head directing which way to fly so as to correct his position when he passes the aperture of the sight bar.

The square arrangement, FIGURE 4, provides both horizontal as well as vertical references for the operator since the planes of action of the four units cover both directions with their combined cues. This forms an optimum visual display for the operator. He need only pilot his craft in response to the cues without any interpretation on his part. The arrows, or the displacement of the sight bar indicates which way to correct. In the event that more than two units are used such as C and D as shown in FIGURE 4 it will be unnecessary to have a separate glide slope indicator because the three or more single plane, moving indications, will form a line in space at the intersection of their planes of action.

It should also be noted that in cases where units are not the same distance from the pilot, the rotation will have to be corrected by means of an eccentric velocity cam so as to synchronize the image with that of the equidistant units.

In FIGURE 15, there is shown a modified form of indicating unit 58 wherein the Fresnel unit 60 is disposed horizontally on two vertical shaft-like members 64 and 66 which also provide support means for the two angularly oriented datum bars 68 and 70, similar to the datum units hereinbefore shown and described. The lower end of the rearmost shaft 64 is coupled through reduction gearing 72 to a driving motor 74 energized and controlled as is the drive for the earlier described indicator units. The assembly including the motor, gearing and sight bars is pivotally mounted on a short shoft 76 the opposite ends of which are journalled in the upstanding portions 78 of the trunnion 80. Scale 82 and marker 84 indicate the angular disposition of the indicator assembly relative to some reference, e.g., horizontal, horizon etc.

The indicator assembly 58 is in the foregoing manner provided with means for rotating or slewing the same about its vertical axis while means is also provided for adjusting the cant or tilt angle of the unit relative to the ground or base reference. The indicating means 86 and 88 serve to aid in adjusting and maintaining adjustment of the unit once a direction of operation and glide path angle has been predetermined.

FIGURE 16 shows a still further modification of the indicator unit embodying the present invention. In this arrangement, four datum bar units 90, 92, 94 and 96 (FIGURE 17) are supported in quadrature by means of the central vertical shaft 98, the short vertical shaft 100 and the horizontal cross-tie members 102. The lower end of shaft 98 is operably associated in driving engagement with reduction gearing 104 and a driving motor 106 in similar arrangement to that illustrated in FIGURE 15. A cross shaft 108 is journalled at opposite ends in the upstanding portions 110 of the trunnion 112. The base of trunnion 112 is provided with a radial surface 114 disposed in sliding contact with the oppositely radially shaped surface 116 of cam block 118. Angular adjustment of the unit is simple and efficient by this means. This construction provides a unitary assembly for use in those situations wherein high density is the normal operation.

In this manner any number of required units can be mounted for the purpose of obtaining a desired spacing of traffic. Four units are shown here as being typical.

What is claimed is:

1. Vehicular guidance apparatus comprising:

(a) first electromagnetic energy radiating means for radiating detectable, sensible energy into an area adjacent said means, (b) second electromagnetic energy radiating means for radiating energy into an area adjacent said means, (c) means for rotating said first and second radiating means at a constant angular velocity effective to cause the energy radiated thereby to intersect at a point remote therefrom and to define a line which effectively moves toward a line joining the radiating means at a constantly decreasing velocity so that an observer moving at the same rate as the movement of said line toward said radiating means is effectively led to a position substantially midway between said radiating means, (d) third electromagnetic energy radiating means operably associated with said first and said second radiating means and providing a relatively narrow lateral angle of view effective to provide the observer with a precise lateral guidance cue, (e) means for synchronizing the rotation of said radiating means, and (f) means providing rock, roll and tilt adjustment of said radiating means effective to change the observer's angle or view thereby to accommodate a variety of different craft with differing approach speeds.

2. Vehicular guidance apparatus comprising:

(a) first electromagnetic energy radiating means for radiating detectable, sensible energy into an area adjacent said means, (b) second electromagnetic energy radiating means for radiating energy into an area adjacent said means, (c) each of said radiating means including a pair of angularly oriented energy radiators and a further energy radiator disposed at the apex thereof providing a course rate cue for an observer utilizing said apparatus, (d) means for rotating said first and second radiating means at a constant angular velocity effective to cause the energy radiated thereby to intersect at a point remote therefrom and to define a line which effectively moves toward a line joining the radiating means at a constantly decreasing velocity so that with the observer moving at the same rate as the movement of said line toward said radiating means the observer is effectively led to a position substantially midway between said radiating means, and (e) a third electromagnetic energy radiating means operably associated with said first and second radiating means and substantially identical thereto providing a course angle cue for the observer relative to the other two radiating means.

3. Vehicular guidance apparatus comprising:

(a) first electromagnetic energy radiating means for radiating detectable, sensible energy into an area adjacent said means, (b) second electromagnetic energy radiating means for radiating energy through an area adjacent said means, (c) each said radiating means including a pair of angular oriented bars of light terminating at the apex thereof in a planar light emitting member, (d) means for adjusting both the tilt angle of said radiating means relative to the plane of its mounting and the angular relation of said radiating means relative to the angle of radiation thereof, (e) means for rotating said first and second radiating means at a constant angular velocity effective to cause the energy radiated thereby to intersect at a point remote therefrom and to define a line which effectively moves toward a line joining the radiating means at a constantly decreasing velocity so that an observer moving at the same rate as the movement of said line toward said radiating means is effectively led to a position substantially midway between said radiating means, and (f) glide angle energy radiating means including means for adjusting the relative position of said last means with respect to the first and second radiating means as well as for altering the relative position of said last means with respect to the axis about which said radiating means is rotatable.

4. Vehicular guidance apparatus comprising:

(a) first electromagnetic energy radiating means for radiating detectable, sensible energy into an area adjacent said means, (b) second electromagnetic energy radiating means for radiating energy through an area adjacent said means, (c) each of said radiating means comprising a pair of primary light emitting members disposed at right angles to one another and having a secondary light emitting member disposed at the intersection thereof, (d) means for rotating said first and second radiating means at a constant angular velocity effective to cause the energy radiated thereby to intersect at a point remote therefrom and to define a line which effectively moves toward a line joining the radiating means at a constantly decreasing velocity so that an observer moving at the same rate as the movement of said line toward said radiating means is effectively led to a position substantially midway between said radiating means, and (e) glide angle energy radiating means including means for adjusting the relative position of said last means with respect to the first and second radiating means as well as for altering the relative position of said last means with respect to the axis about which said radiating means is rotatable, (f) means mounting said glide angle radiating means at right angles to said first and second radiating means and contiguous with said first radiating means.

5. Vehicular guidance apparatus comprising:

(a) first electromagnetic energy radiating means for radiating detectable, sensible energy into an area adjacent said means, (b) a second electromagnetic energy radiating means for radiating energy through an area adjacent said means, (c) each of said radiating means including quadrantally arranged energy radiators disposed in pairs, the members of each pair being oriented at right angles to each other and having an additional energy radiator disposed at the intersections of each pair of radiators, (c) means for rotating said first and second radiating means at a constant angular velocity effective to cause the energy radiated thereby to intersect a point remote therefrom and to define a line which effectively moves toward a line joining the radiating means at a constantly decreasing velocity so that an observer moving at the same rate as the movement of said line toward said radiating means is effectively led to a position substantially midway between said radiating means, and (e) a third electromagnetic energy radiating means similar to said first and second radiating means operably associated with said first and second radiating means providing a fine course adjustment cue for the observer relative to the other two radiating means.

6. Vehicular guidance apparatus comprising:

(a) first electromagnetic energy radiating means for radiating detectable, sensible energy into an area adjacent said means, (b) second electromagnetic energy radiating means for radiating energy through an area adjacent said means, (c) each of said radiating means including quadrantally arranged energy radiators disposed in pairs, the members of each pair being oriented at right angles to each other and being provided with an additional energy radiator located at the point of intersection of each pair of radiators, (d) means supporting said radiating means for movement about two axes at right angles to each other, (e) cam means for changing the relative position of said radiating means with respect to the horizontal, (f) means for rotating said first and second radiating means at a constant angular velocity effective to cause the energy radiated thereby to intersect at a point remote therefrom and to define a line which effectively moves toward a line joining the radiating means at a constantly decreasing velocity so that an observe moving at the same rate as the movement of said line toward said radiating means is effectively led to a position substantially midway between said radiating means, and (g) third electromagnetic energy radiating means operably associated with said first and second radiating means and providing a relatively narrow lateral angle of view effective to provide the observer with a precise lateral guidance cue.

7. Vehicular guidance apparatus comprising:

(a) a pair of electromagnetic energy radiating means for radiating detectable, sensible energy into an area adjacent said means, (b) each of said radiating means having a pair of energy radiators arranged at right angles to each other and including a secondary radiator located at the intersection of each pair, (c) a trunnion to which each said radiating means is mounted for rocking, tilting movement including indicating means for indicating the degree of adjustment thereof, (d) means mounting said trunnion for swiveling rotation about a fixed member including indicating means for establishing the direction and degree of adjustment thereof, (e) means for rotating said radiating means at a constant angular velocity causing the radiated energy of said radiating means to intersect at a point remote therefrom in a manner defining a line which moves toward the line joining the radiating means at a constantly decreasing velocity whereby an observer moving at the same rate is led to a position substantially midway between said radiating means, (f) another electromagnetic energy radiating means adjustably angularly disposed relative to said pair of radiating means for radiating energy at a desired glide slope angle relative to said pair of radiating means, and (g) means for synchronizing the rotation of said radiating means.

References Cited by the Examiner

UNITED STATES PATENTS

| | | | |
|---|---|---|---|
| 2,586,810 | 2/1952 | Frum | 343—108 X |
| 2,977,592 | 3/1961 | Bruck | 343—108 |
| 2,991,743 | 7/1961 | Ogle | 240—1.2 X |

FOREIGN PATENTS

| | | |
|---|---|---|
| 456,838 | 11/1936 | Great Britain. |

CHESTER L. JUSTUS, *Primary Examiner.*

H. C. WAMSLEY, *Assistant Examiner.*